United States Patent [19]

Cooper

[11] 4,308,788
[45] Jan. 5, 1982

[54] FLUID PRESSURE RESPONSIVE APPARATUS

[75] Inventor: William J. Cooper, Los Angeles, Calif.

[73] Assignee: International Telephone and Telegraph Corporation, New York, N.Y.

[21] Appl. No.: 140,581

[22] Filed: Apr. 15, 1980

Related U.S. Application Data

[62] Division of Ser. No. 63,179, Aug. 3, 1979, Pat. No. 4,247,078.

[51] Int. Cl.³ .............................................. F16J 3/04
[52] U.S. Cl. .................................... 92/37; 92/40; 92/44; 92/130 B; 92/131
[58] Field of Search ............... 92/7, 40, 9, 44, 38, 92/37, 130 B, 131

[56] References Cited

U.S. PATENT DOCUMENTS

| | | | |
|---|---|---|---|
| 2,536,435 | 1/1951 | Fox | 92/7 |
| 2,664,749 | 1/1954 | Jones | 92/10 |
| 2,735,369 | 2/1956 | Turvey | 92/40 |
| 2,857,495 | 10/1958 | Bourns | 92/40 |
| 3,022,800 | 2/1962 | Boonshaft | 92/40 |
| 3,053,281 | 9/1962 | Taylor | 92/40 |
| 3,820,755 | 6/1974 | Greenwood | 251/86 |

FOREIGN PATENT DOCUMENTS 843144  8/1960  United Kingdom .

*Primary Examiner*—Abraham Hershkovitz
*Attorney, Agent, or Firm*—A. Donald Stolzy

[57] ABSTRACT

A differential pressure unit having overrange valves loosely mounted on a valve stem connected between the ends of a respective pair of movable bellows ends. A pair of spiral range springs bias both valves toward open positions. The valves include annular elastomers bonded to the edges of the apertured discs. The apertures in the discs act to allow the elastomers to seat and to unseat without causing lock-up. The discs are retained between plates and snap rings.

1 Claim, 5 Drawing Figures

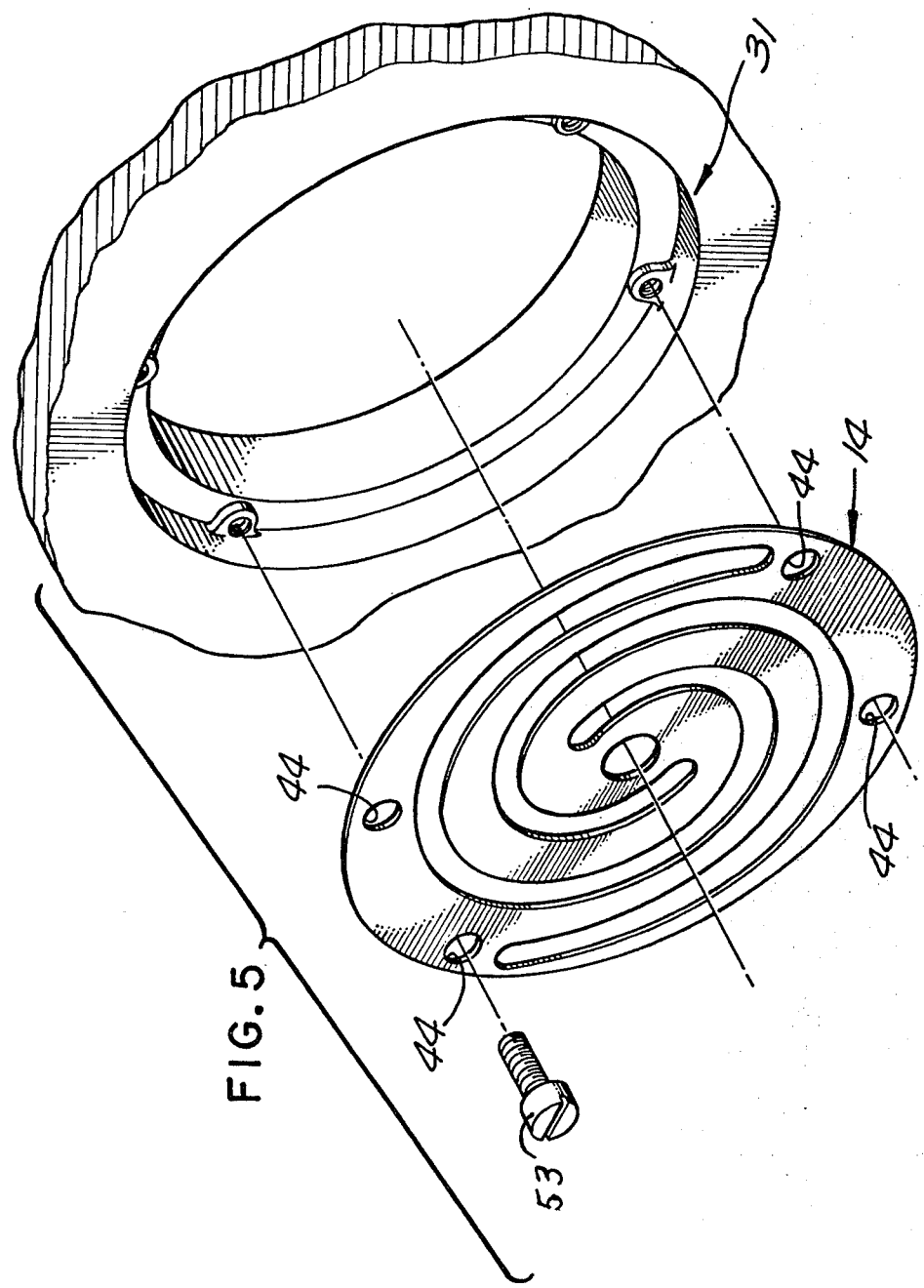

FLUID PRESSURE RESPONSIVE APPARATUS

This is a division of application Ser. No. 063,179, filed Aug. 3, 1979, now U.S. Pat. No. 4,247,078.

BACKGROUND OF THE INVENTION

This invention relates to valves, and more particularly to overrange valves or the like to protect structures from excessive pressures.

PRIOR ART STATEMENT

Overrange valves are employed in conventional differential pressure units. Examples of the same are disclosed in the following:

Copending application Ser. No. 965,295 filed Nov. 30, 1978, by W. J. Cooper for METHOD OF AND APPARATUS FOR MAKING A BELLOWS assigned to the assignee of the instant application;

Jones U.S. Pat. No. 2,664,749 issued Jan. 5, 1954;

Greenwood et al. U.S. Pat. No. 3,820,755 issued June 28, 1974.

None of the said Cooper, Jones and Greenwood et al. disclosures have the best construction to prevent overrange valves from sticking or, locking closed. However, Greenwood et al. discloses a tiltable poppet valve.

SUMMARY OF THE INVENTION

In accordance with the valve of the present invention, the above-described and other disadvantages of the prior art are overcome by providing a seal carrying disc slidable and/or tiltable on a stem.

A feature of the invention resides in the use of a vented seal to prevent lock-up.

BRIEF DESCRIPTION OF THE DRAWINGS

In the accompanying drawings which illustrate exemplary embodiments of the present invention:

FIG. 5 is a broken away, exploded perspective view illustrating the manner in which spiral springs are mounted in FIG. 1.

DESCRIPTION OF THE PREFERRED EMBODIMENT

Figure 1:
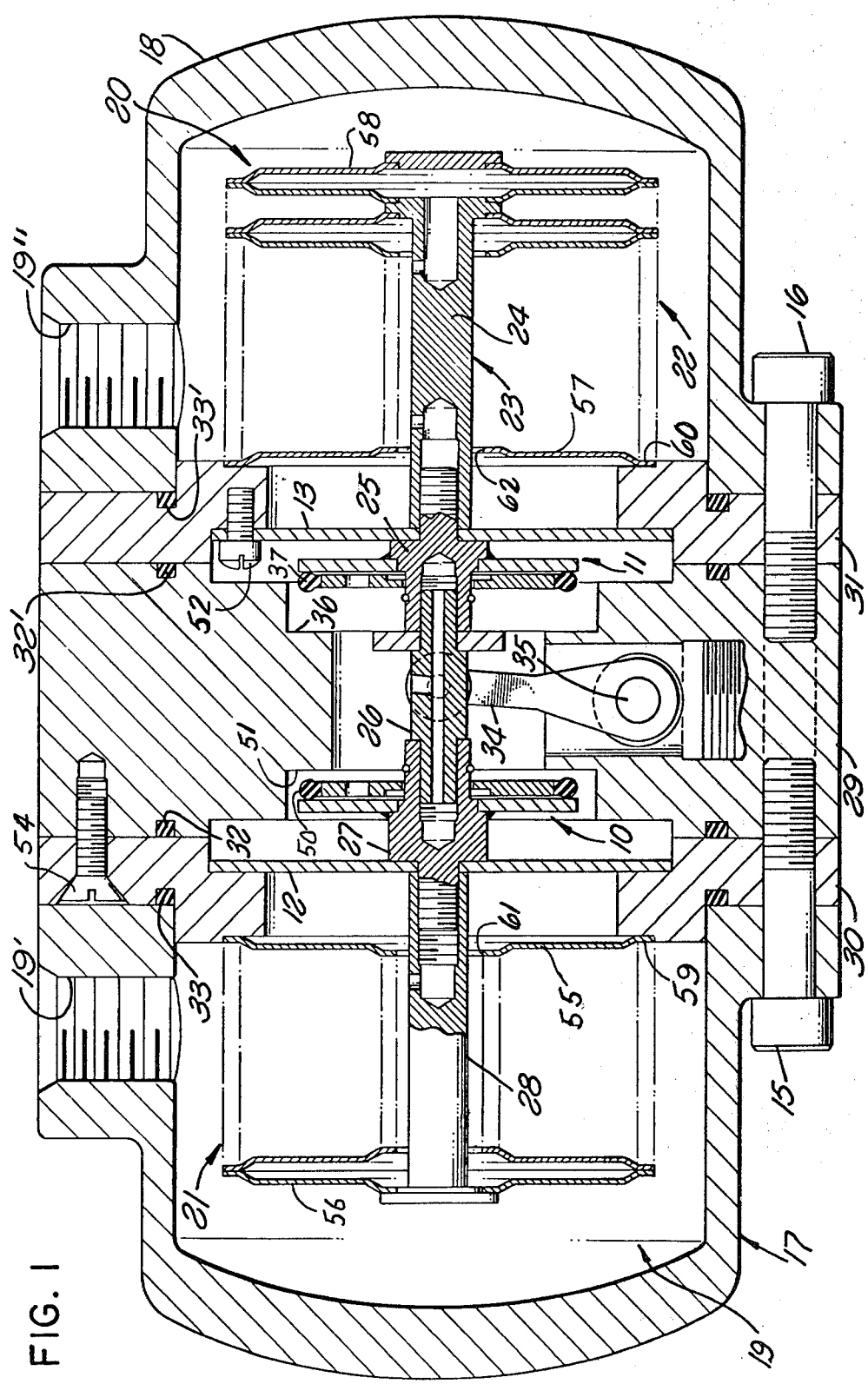
FIG. 1 is a longitudinal sectional view of a differential pressure unit (DPU) constructed in accordance with the present invention.

The DPU shown in FIG. 1 may be conventional except for arrangements 10 and 11 providing overrange valves, and spiral springs 12 and 13 which may be identical to each other and to spiral spring 14 shown in FIG. 5.

The DPU assembly is held together by cap screws 15 and 16, the outer portions of the DPU including hat-shaped sections 17 and 18. Hat-shaped sections 17 and 18 have two openings thereinto, only one of which is shown at 19 in FIG. 1. See also the said Jones patent.

Sections 17 and 18 provide chambers 19 and 20 in which bellows 21 and 22 are mounted.

A stem 23 extends through most of the interior of the DPU, and all parts thereto are substantially fixed relative to each other. Part 24 is fixed relative to the right end of bellows 22, and is threaded to part 25. A central part 26 is threaded inside parts 27 and 25. Part 27 is threaded inside part 28.

The DPU has a central portion 29 sealed to portions 30 and 31 to which sections 17 and 18 are sealed respectively.

Seals are indicated at 32, 32', 33, and 33'. An arm 34 rotates a torque tube 35 responsive to reciprocation of stem 23, the operation of which and construction of which may be identical to those shown in the said Jones patent.

Figure 2:
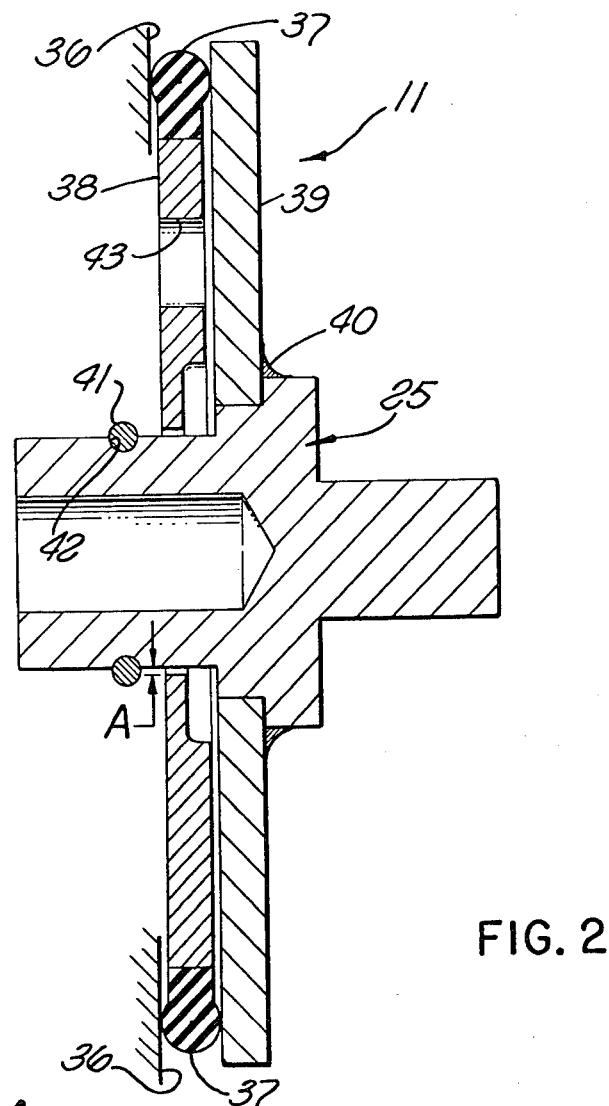
FIG. 2 is an enlarged longitudinal sectional view of a portion of the DPU shown in FIG. 1.

Due to the fact that arrangement 10 is essentially the same as an arrangement 11, although arrangements 10 and 11 are reversed, only arrangement 11 will be described in greater detail. An enlarged view of arrangement 11 is shown in FIG. 2. An elastomer such as rubber at 37 is bonded to a disc 38. Elastomer 37 is pressed against a fixed surface 36 (see both FIGS. 1 and 2) by a plate 39 welded or sealed at 40 to part 25.

Note will be taken that surface 36 lies in a plane substantially transverse to the longitudinal axis of the DPU in FIG. 1 and is annular.

As shown in FIG. 2, a snap ring 41 is substantially fixed in a groove 42 in part 25. When elastomer 37 is spaced from surface 36 as in FIG. 1, note will be taken that disc 38 can move in a radial or in an axial direction or can tilt. This makes it possible for a good seal to be provided by elastomer 37 between surface 36 and the right hand surface of plate 39.

In FIG. 2, note that space is provided at A so that the fit of disc 38 is somewhat loose.

Figure 3:
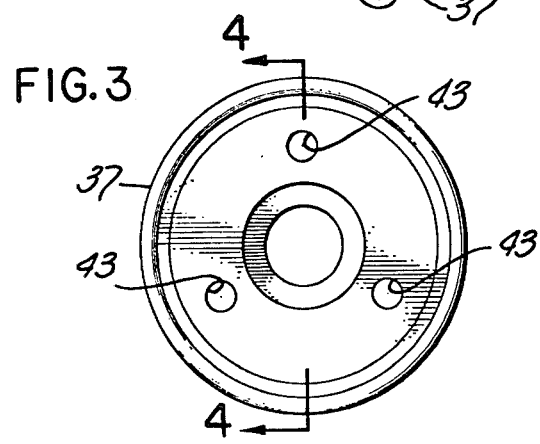
FIG. 3 is a front elevational view of parts shown in FIGS. 1 and 2.
Figure 4:
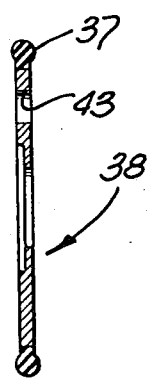
FIG. 4 is a verticle sectional view of the parts taken on the line 4—4 shown in FIG. 3.

Disc 38 and elastomer 37 are shown again in FIGS. 3 and 4 to a scale substantially the same as that to which they have been shown in FIG. 1.

In FIG. 3, note that disc 38 has 3 holes 43 extending completely therethrough. As shown in FIG. 2, holes 43 permit the escape and ingress of an incompressible liquid respectively from and to the space between disc 38 and plate 39. Note will be taken that without holes 43, if the said spaces are sealed, stem 23 may stick with the valve of one of the arrangements 10 or 11 closed.

Spring 14 shown in FIG. 5 may be entirely conventional, if desired. Screw holes are indicated at 44. Spring 13 would fit in DPU portion 31 in the same manner that spring 14 would and as shown in FIG. 5. Spring 12 would be similarly mounted in DPU portion 30.

Cap screws 52 and 53 in FIGS. 1 and 5 are typical.

In FIG. 1, chambers 19 and 20 are essentially cylindrical having an axis the same as that of stem 23.

Bellows 21 and 22 may be old in the art. For example, see the bellows in British Pat. No. 1,356,783 and in the said copending application Ser. No. 965,295.

A single spiral spring such as spring 14 in a differential pressure unit is old in the art. See for example, spring 76 in FIG. 3 of British Pat. No. 843,144.

In FIG. 1, 19' and 19" are threaded ports allowing fluid to enter and to fill chambers 19 and 20.

Stem 23 has parts 24, 25, 26, 27 and 28. Springs 12 and 13 are substantially identical to spring 14 shown in FIG. 5. Parts 24 and 25 are fixed relative to spring 13. Parts 27 and 28 are fixed relative to spring 12.

A typical countersunk screw is provided at 54.

OPERATION

The mode of operation of the device is as follows.

If the pressure inside section 17 and outside bellows 21 exceeds that in section 20 but outside bellows 22, stem 23 moves to the right and turns torque tube 35 clockwise. If the differential pressure is large enough, elastomer 50 seals against shoulder 51 (FIG. 1) and keeps excessive pressure inside and outside the bellows 21 from bursting bellows 22.

Conversely, excess pressure within section 18 will not burst bellows 21 because elastomer 37 will seal with surface 36 (FIGS. 1 and 2).

Otherwise, without elastomers 37 or 50 sealing, torque tube 35 is rotated an amount proportional to the difference between the pressures in sections 17 and 18.

When the pressure in chamber 20 is higher than that in chamber 19, torque tube 35 is rotated in a counterclockwise direction.

The differential pressure unit (DPU) of FIG. 1 may be described as "apparatus". Central portion 29 and portions 30 and 31 may be described as a mounting ring assembly. Bellows 21 has an open end 55 and a closed end 56. Similarly, bellows 22 has an open end 57 and a closed end 58. Discs 55 and 57 are sealed at 59 and 60, respectively, and have openings 61 and 62.

Springs 12, 13 and 14 all are disc-like planar springs fixed in the manner shown in FIG. 5 to portion 31.

Springs 12, 13 and 14 may be entirely conventional, if desired. All three may have a pair of spiral slots of a polar symmetry. The same type of slots are shown in FIG. 5.

What is claimed is:

1. Fluid pressure responsive apparatus, said apparatus comprising: a mounting ring assembly; first and second bellows each having an open end and a closed end, said open ends being sealed around respective opposite sides of said mounting ring assembly; first and second disc-like planar springs, said first spring being fixed at its periphery to one side of said mounting ring assembly, said second spring being fixed at its periphery to the other side of said mounting ring assembly, each of said springs having a pair of spiral slots of polar symmetry; a first stem having one end fixed to the center of said first spring and another end fixed to the center of said first bellows closed end; a second stem having one end fixed to said second spring and another end fixed to the center of said second bellows closed end, the centers of said first and second springs being fixed relative to each other, said first and second springs biasing both of said first and second bellows against a differential pressure thereacross and guiding the same and said first and second stems and limiting movement of said first and second stems and said bellows approximately to an axial direction; and a housing around each of said bellows to admit fluids of the same or different pressures to the respective exteriors of each of said bellows.

* * * * *